United States Patent
Luukkala et al.

(10) Patent No.: US 9,900,158 B2
(45) Date of Patent: Feb. 20, 2018

(54) CRYPTOGRAPHICALLY AUTHENTICATED COMMUNICATION

(75) Inventors: Vesa-Veikko Luukkala, Espoo (FI); Sampo Sovio, Riihimäki (FI); Harald Kaaja, Järvenpää (FI); Sergey Boldyrev, Söderkulla (FI); Ian Oliver, Söderkulla (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/386,783

(22) PCT Filed: Mar. 23, 2012

(86) PCT No.: PCT/FI2012/050300
§ 371 (c)(1),
(2), (4) Date: Jan. 19, 2015

(87) PCT Pub. No.: WO2013/140022
PCT Pub. Date: Sep. 26, 2013

(65) Prior Publication Data
US 2015/0163064 A1  Jun. 11, 2015

(51) Int. Cl.
*H04L 29/06* (2006.01)
*H04L 9/32* (2006.01)
*H04L 9/08* (2006.01)
*H04W 12/06* (2009.01)
*H04L 29/08* (2006.01)

(52) U.S. Cl.
CPC .......... *H04L 9/3247* (2013.01); *H04L 9/0861* (2013.01); *H04L 9/3268* (2013.01); *H04L 9/3271* (2013.01); *H04L 63/0823* (2013.01); *H04W 12/06* (2013.01); *H04L 67/141* (2013.01)

(58) Field of Classification Search
CPC ... H04L 9/3247; H04L 9/3271; H04L 9/3268; H04L 9/0861
USPC .......................................... 713/176; 340/10.1
See application file for complete search history.

(56) References Cited

U.S. PATENT DOCUMENTS 8,490,151 B2   7/2013   Boldyrev et al.
8,745,121 B2   6/2014   Boldyrev et al.
(Continued)

FOREIGN PATENT DOCUMENTS

CN   10673351   3/2010
CN    1991859   5/2010
(Continued)

OTHER PUBLICATIONS

Zhou, "Declarative Secure distributed information systems", Apr. 2013, Computer Languages, Systems & Structures, pp. 1-24.*
(Continued)

*Primary Examiner* — Taghi Arani
*Assistant Examiner* — Gregory Lane
(74) *Attorney, Agent, or Firm* — Alston & Bird LLP (57) ABSTRACT

A system for cryptographically authenticated communication, wherein an activation signal is sent from a communications device to a memory device (410). The memory device derives a random challenge from at least one physical property of the activation signal and sends it back to the communications device (420). A signature is computed using the received random challenge (440) and sent, together with a certificate, to the memory device (450).

19 Claims, 6 Drawing Sheets

(56) References Cited

U.S. PATENT DOCUMENTS

| | | | |
|---|---|---|---|
| 2004/0066278 A1* | 4/2004 | Hughes | G06F 21/31 340/10.1 |
| 2004/0196978 A1* | 10/2004 | Godfrey | G06Q 10/107 380/270 |
| 2006/0069650 A1* | 3/2006 | Hori | G06Q 10/10 705/57 |
| 2006/0075247 A1* | 4/2006 | Stevens | H04L 9/3247 713/178 |
| 2006/0085354 A1* | 4/2006 | Hirai | G06F 21/10 705/59 |
| 2006/0212706 A1* | 9/2006 | Jiang | H04L 9/0825 713/176 |
| 2007/0100921 A1 | 5/2007 | Barnett et al. | |
| 2007/0133790 A1* | 6/2007 | Chang | G06F 7/588 380/46 |
| 2007/0140488 A1* | 6/2007 | Dharmaji | H04N 7/165 380/212 |
| 2007/0250704 A1 | 10/2007 | Hallam-Baker | |
| 2008/0027865 A1* | 1/2008 | Usui | G06Q 20/12 705/50 |
| 2008/0162926 A1* | 7/2008 | Xiong | G06F 21/445 713/155 |
| 2008/0235774 A1* | 9/2008 | Tsuyuzaki | G07C 9/00309 726/7 |
| 2009/0115600 A1 | 5/2009 | Lee et al. | |
| 2010/0293095 A1* | 11/2010 | Adkins | G06Q 30/02 705/50 |
| 2011/0258430 A1 | 10/2011 | Luukkala et al. | |
| 2011/0320805 A1 | 12/2011 | Chaves et al. | |
| 2012/0036364 A1* | 2/2012 | Yoneda | H04L 9/30 713/175 |
| 2012/0137043 A1 | 5/2012 | Varteva et al. | |
| 2013/0148805 A1 | 6/2013 | Ekberg et al. | |
| 2013/0166646 A1 | 6/2013 | Oliver et al. | |
| 2013/0166726 A1 | 6/2013 | Boldyrev et al. | |
| 2013/0187764 A1* | 7/2013 | Smith | H04L 9/3271 340/10.42 |
| 2014/0213185 A1 | 7/2014 | Arponen et al. | |

FOREIGN PATENT DOCUMENTS

| | | |
|---|---|---|
| EP | 2077514 | 7/2009 |
| EP | 2088562 A1 | 8/2009 |
| KR | 100754940 B1 | 9/2007 |
| KR | 20090065736 A | 6/2009 |
| KR | 20100071179 A | 6/2010 |
| WO | 2012/172391 A1 | 12/2012 |
| WO | 2013/034796 A1 | 3/2013 |

OTHER PUBLICATIONS

Lopez et al., "RFID Systems: A Survey on Security Threats and Proposed Solutions", Personal Wireless Communications Lecture Notes in Computer Science, vol. 4217, 2006, pp. 159-170.

International Search Report and Written Opinion received for corresponding Patent Cooperation Treaty Application No. PCT/FI2012/050300 , dated Mar. 14, 2013, 18 pages.

Extended European Search Report received for corresponding European Patent Application No. 12871642.0, dated Oct. 16, 2015, 7 pages.

Office Action for corresponding Chinese Patent Application No. 201280073388.7 dated Jan. 20, 2017.

European Office Action for European Patent Application No. 12871642.0 dated Sep. 7, 2016, 5 pages.

"Public Key Certificate." [online] [retrieved Aug. 29, 2016]. Retrieved from the Internet: <URL: https://en.wikipedia.org/w/index.php?title=Public_key_certificate&oldid=481234367>. (dated Aug. 10, 2016) 6 pages.

Office Action for European Patent Application No. 12871642.0 dated Oct. 20, 2017, 4 pages.

* cited by examiner

CRYPTOGRAPHICALLY AUTHENTICATED COMMUNICATION

RELATED APPLICATION

This application was originally filed as PCT Application No. PCT/FI2012/050300 filed Mar. 23, 2012.

TECHNICAL FIELD

The present application generally relates to cryptographically authenticated communication.

BACKGROUND

Mobile communication devices and their environments are becoming increasingly complicated and the security demands of communication are increasing respectively.

The increase of the number of devices and services providing information or distributed content through wireless communications has created new demands for security of communications.

Moreover, the users of mobile information services are increasingly interested not only on security, but also on their privacy. The users do not generally want to adopt new services if there is doubt on the protection of the users' data. There are also differing needs depending on the service and information. Thus, it has become increasingly difficult to manage how each piece of information should be stored and shared with other devices or users.

SUMMARY

Various aspects of examples of the invention are set out in the claims.

According to a first example aspect of the invention, there is provided a communications device comprising:
a memory unit; and
an input/output interface;
at least one processor configured to:
send an activation signal to a memory device;
receive from the memory device a random challenge derived from at least one physical property of said signal;
compute a signature including the random challenge; and to
send the signature and a certificate to the memory device.

The at least one processor may be further configured to calculate the signature using the random challenge and a private key.

The at least one processor may be further configured to calculate an encrypted session key using the random challenge and a public key; and to calculate the signature using the session key and a private key.

The at least one processor may be further configured to calculate an encrypted session key using the random challenge and a public key; to calculate a computational closure by encapsulating the session key and a privacy policy; and to calculate the signature using the computational closure and a private key.

The at least one processor may be further configured to send the session key or the computational closure to the memory device.

According to a second example aspect of the invention there is provided a memory device comprising:
a memory unit; and
an input/output interface;
at least one processor configured to
receive an activation signal from a communications device;
derive a random challenge from at least one physical property of the activation signal; and to
provide the random challenge for a communications device.

The at least one processor may be further configured to store said random challenge into a first preselected section of the memory unit.

The at least one processor may be further configured to send said random challenge as a part of a section of a protocol frame.

The at least one processor may be further configured to receive a signature including the random challenge and a certificate; and to store said signature and said certificate into a second preselected section of the memory unit.

The at least one processor may be further configured to remove said random challenge from the first preselected section of the memory unit.

The at least one processor may be further configured to derive the random challenge by interpreting noise of a radio signal as information bits.

The at least one processor may be further configured to derive the random challenge by receiving bits with the quench turned off.

The memory device may further comprise a quench for receiving information over radio signals. The at least one processor may be further configured to derive the random challenge by interpreting the signal with the quench turned off.

The at least one processor may be further configured to derive the random challenge by using duration of the signal to calculate random bits.

The at least one processor may be further configured to receive the session key or the computational closure from the communications device.

The at least one processor may be further configured to store the signature, the certificate and the session key or computational closure in a protected section of the memory unit.

The at least one processor may be further configured to receive an activation signal from a second communications device; and to send the signature and the certificate to the second communications device.

The at least one processor may be further configured to send the session key or the computational closure to the second communications device.

According to a third example aspect of the invention, there is provided a system comprising;
a memory device according to a second example aspect of the invention;
a first communications device according to a first example aspect of the invention; and
a second communications device comprising:
a third memory unit; and a third input/output interface; and
at least one third processor configured to:
send the activation signal to the memory device;
receive the signature and the certificate of the first communications device from the memory device; and to
validate the signature and the certificate using public certificates.

The at least one third processor may be further configured to receive a session key or a computational closure of the first communications device from the memory device.

The at least one third processor may further be configured to decrypt the session key to obtain a random challenge associated with the first communications device. The at least one third processor may be further configured to form a session with the first communications device using the random challenge.

The at least one third processor may be further configured to execute the computational closure to check the privacy policy of the first communications device.

The at least one third processor may be further configured to decrypt the session key to obtain a random challenge associated with the first communications device. The at least one third processor may be further configured to, depending on the privacy policy of the first communications device to form a session with the first communications device using the random challenge.

According to a fourth example aspect of the invention, there is provided a method comprising:

sending an activation signal to a memory device;

receiving a random challenge derived from at least one physical property of said signal from said memory device;

computing a signature using said random challenge; and sending the computed signature and a certificate to the memory device.

According to a fifth example embodiment, there is provided a method comprising:

receiving an activation signal from a communications device;

deriving a random challenge from at least one physical property of the activation signal; and providing the random challenge for a communications device.

The method may further comprise storing said random challenge into a first preselected section of a memory unit.

The method may further comprise sending said random challenge as a part of a section of a protocol frame.

The method may further comprise receiving a signature computed using the random challenge and a certificate; and storing said signature and said certificate into a second preselected section of the memory unit.

The method may further comprise removing said random challenge from the first preselected section of the memory unit.

The random challenge may be derived by interpreting noise of the signal as information bits.

The random challenge may be derived by receiving bits with the quench turned off.

The random challenge may be derived by interpreting the signal with the quench turned off.

The random challenge may be derived by using the duration of the signal to calculate random bits.

The signature may be calculated using the random challenge and a private key.

An encrypted session key may be calculated using the random challenge and a public key. The signature may be calculated using the session key and a private key.

An encrypted session key may be calculated using the random challenge and a public key. A computational closure may be calculated by encapsulating the session key and a privacy policy. The signature may be calculated using the computational closure and a private key.

The session key or the computational closure may be sent to the memory device.

The session key or the computational closure may be received from the communications device.

The signature, the certificate and the session key or computational closure may be stored in a protected section of memory unit.

The method may further comprise receiving an activation signal from a second communications device. The method may further comprise sending the signature and the certificate to the second communications device.

The session key or the computational closure may be sent to the second communications device.

According to a sixth example aspect of the invention, there is provided a method comprising:

sending an activation signal to a memory device;

receiving a signature and a certificate of at least one communications device from the memory device; and validating the signature and the certificate using public certificates.

The method may further comprise receiving a session key or a computational closure of at least one communications device from the memory device.

The method may further comprise encrypting the session key to obtain a random challenge associated with a first communications device. The method may further comprise forming a session with the first communications device using the random challenge.

The method may further comprise executing the computational closure to check the privacy policy of a first communications device. The method may further comprise encrypting the session key to obtain a random challenge associated with the first communications device. The method may further comprise, depending on the privacy policy of the first communications device, forming a session with the first communications device using the random challenge.

According to a seventh example aspect of the invention, there is provided a computer program, comprising:

code for performing a method of any example aspect of the invention, when the computer program is run on a processor.

According to an eight example aspect of the invention, there is provided a memory medium comprising the computer program of the seventh example aspect.

Any foregoing memory medium may comprise a digital data storage such as a data disc or diskette, optical storage, magnetic storage, holographic storage, opto-magnetic storage, phase-change memory, resistive random access memory, magnetic random access memory, solid-electrolyte memory, ferroelectric random access memory, organic memory or polymer memory. The memory medium may be formed into a device without other substantial functions than storing memory or it may be formed as part of a device with other functions, including but not limited to a memory of a computer, a chip set, and a sub assembly of an electronic device.

Different non-binding example aspects and example embodiments of the present invention have been illustrated in the foregoing. The foregoing example embodiments are used merely to explain selected aspects or steps that may be utilized in implementations of the present invention. Some example embodiments may be presented only with reference to certain example aspects of the invention. It should be appreciated that corresponding example embodiments may apply to other example aspects as well.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

An example embodiment of the present invention and its potential advantages are understood by referring to FIGS. 1 through 7 of the drawings.

Figure 1:
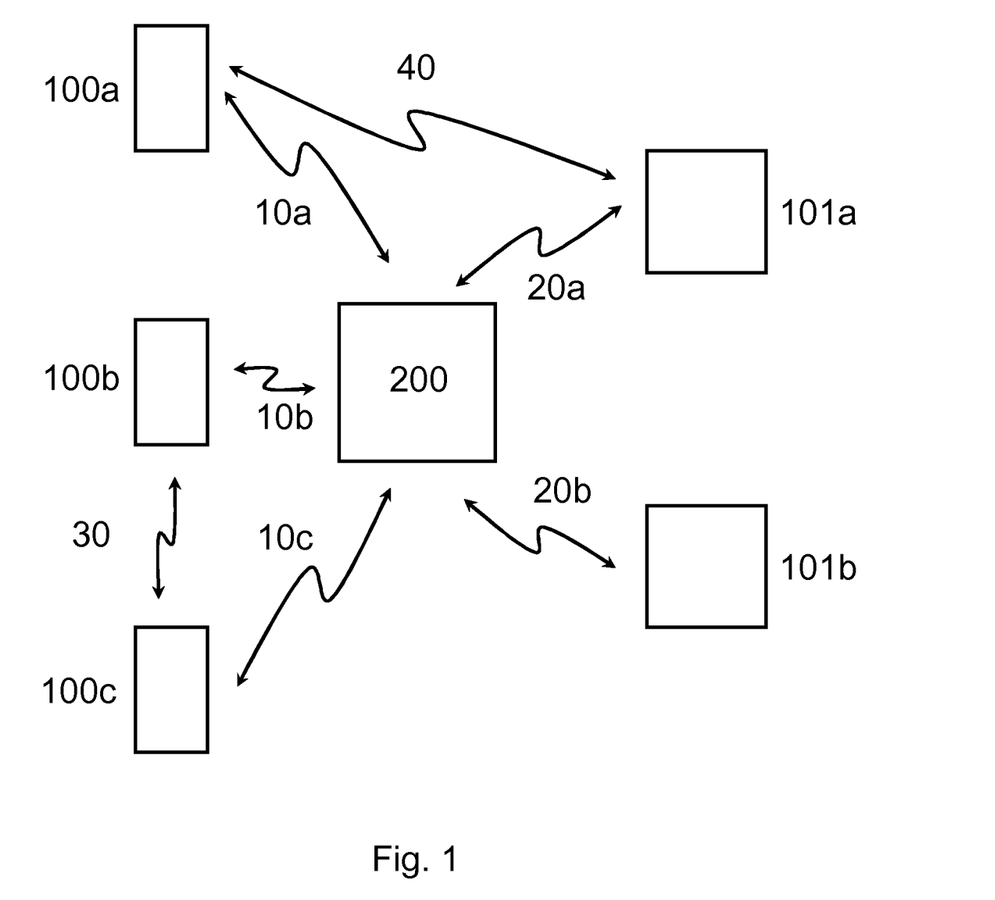
FIG. 1 shows a block diagram of an environment of random challenge messaging according to one example embodiment of the invention.

FIG. 1 illustrates a block diagram of an environment of the random challenge messaging according to one example embodiment of the invention. As shown in FIG. 1, communications devices 100a, 100b and 100c, a memory device 200, and communications devices 101a and 101b form the environment. The communications devices 100a to 100c, as well as the communications devices 101a to 101b are configured to communicate with the memory device 200 in accordance with an example embodiment of the random challenge messaging method described hereinafter. Furthermore, the communication devices 100a to 100c and 101a to 101b are configured to communicate with each other in an example embodiment of the random challenge messaging method. Memory device 200 is configured to derive a random challenge from at least one physical property of the first communications signal received from a communications device 100a to 100c. The communications device 100a to 100c is configured to read and receive the random challenge and associate it with the communication 10a to 10c, or touch event, with the memory device 200. The communications device 100a to 100c is further configured to form and/or to compute and/or to encrypt and to store a signature, a certificate, a session key and/or a computational closure into a memory unit of the memory device 200 i.e. into a first storage (reference sign 210 in FIG. 2).

In some example embodiments of the random challenge messaging, a communications device 101a to 101b is configured to communicate with the memory device 200 and to retrieve the signature, the certificate, the session key and/or the computational closure stored in the first storage 210 in order to receive information on the communication devices 100a to 100c which have previously communicated with the memory device 200.

In some example embodiments of the random challenge messaging, the communications device 101a to 101b is configured to start a communication, or a session, 20a to 20b with the communications device 100a to 100c. The communications device 101a to 101b is configured to obtain the random challenge, which the memory device 200 has derived from at least on physical property of a radio signal, from the information that communications device 100a to 100c has stored into the first storage 210. The communications device 101a to 101b is configured to compute, decrypt and/or execute the signature, the certificate, the session key and/or the computational closure the retrieved from the memory device 200 to obtain the random challenge associated with the communication, or touch event, 10a to 10c. The communications device 101a to 101b is configured to use the random challenge, which the communications device 100a to 100c has previously associated with the communication, or touch event, 10a to 10c to start a communication, or a session, 20a to 20b.

In an example embodiment, communications devices 100a to 100c and 101a to 101b are personal computers and/or servers and/or mobile phones and/or tablet computers and/or other handheld or portable electronic devices.

In an example embodiment, the memory device 200 is a standalone memory device, such as a radio frequency identification (RFID) tag or a radio frequency (RF) memory tag, which is either integrated or embedded into a communications device or not integrated or embedded. The memory device 200 is either an active and comprises an internal power source or passive and relies on receiving a powering signal. Moreover, in one example embodiment, the memory device 200 is able to operate either as a passive or active device.

In an example embodiment, the communications devices 100a to 100c, the communications devices 101a to 101b and the memory device 200 are configured to support wireless communications, wherein one radio frequency, e.g. ultra-high frequency (UHF), is provided for power transfer and another radio frequency, e.g. impulse ultra-wideband (UWB), is provided for wireless data transfer. Moreover, in one example embodiment, one or more of the communications devices 100a to 100c, the communications devices 101a to 101b and the memory device 200 are configured to support wireless communications using near field communication (NFC) for power transfer and for finding and selecting other devices in the proximity. The memory device 200 is further configured to support near field communication (NFC) for initial data transfer and further configured to support wideband wireless communications, e.g. impulse ultra-wideband (UWB), for any further data transfer requiring high capacity.

Figure 2:
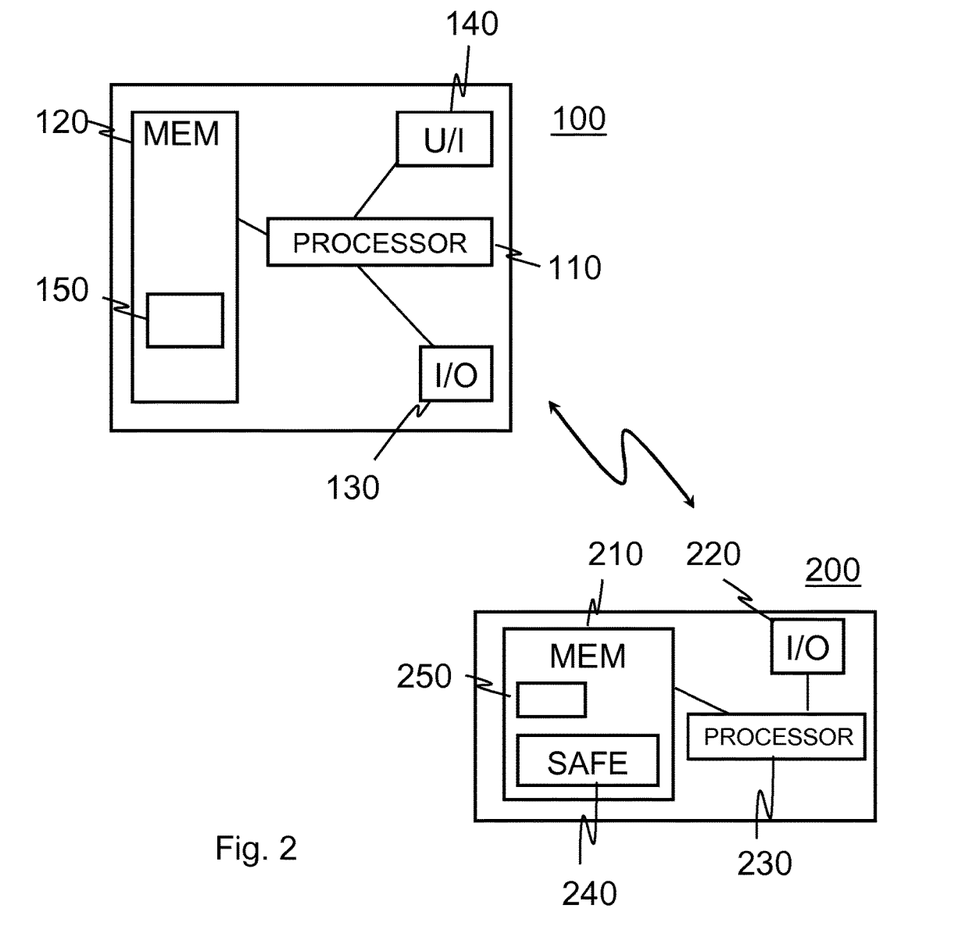
FIG. 2 shows a block diagram of a system suited for random challenge messaging according to an example embodiment.

FIG. 2 illustrates a block diagram of a system suited for random challenge messaging according to an example embodiment. FIG. 2 shows the communications device 100 and a memory device 200. The communications device 100 comprises a processor 110, a second memory unit 120, an input/output (I/O) interface 130, and a user interface (UI) 140. The communications device 100 further comprises software 150 stored in the second memory unit 120 and operable to be loaded into and executed in the processor 110. According to an example embodiment the processor 110 is a central processing unit (CPU), a microprocessor, a digital signal processor (DSP) or the like. FIG. 2 shows one processor, but in some embodiments the apparatus 100 comprises a plurality of processors.

The memory device 200 comprises a processor 230, an input/output (I/O) interface 220, the previously mentioned first memory unit 210, and a protected section 240. The memory device 200 further comprises software 250 stored in the first memory unit 210 and operable to be loaded into and executed in the processor 230. According to an example embodiment the processor 230 is a central processing unit (CPU), a microprocessor, a digital signal processor (DSP) or the like. FIG. 2 shows one processor, but in some example embodiments the apparatus 200 comprises a plurality of processors. In an example embodiment the memory unit 210 of the memory device 200 comprises dedicated memory area for storing the random challenges and a further dedicated storage area for storing responses to the random challenges.

The communications device 100 is configured to communicate with the memory device 200 using random challenge messaging according to an example embodiment. The input/output interface 130 of the communications device 100 is configured to send and receive signals to and from the memory device 200 using wireless communications. Respectively, the input/output interface 220 of the memory device 200 is configured to send and receive massages to and from the communications device 100. The input/output interfaces 130,220 are configured to be in connection with and may be controlled by the corresponding processors 110,230 and/or any software executed by the processors 110,230.

In an example embodiment, the signals transmitted to and from the communications device 100 and memory device 200 comprise protocol frames as defined hereinafter and the processor and/or the first memory unit and/or input/output interface is configured to interpret and/or process and/or create the protocol frames. The protocol frames refer in one example embodiment to physical layer frames such as commands sent as packets between the communications device 100 and memory device 200. In another example embodiment, the protocol frames refer to link layer frames. Furthermore, in one embodiment the dedicated memory areas of the memory unit 210 are configured to process and/or operate a messaging sequence using the protocol frames. In an example embodiment, the memory device 200 or the input/output interface 220 thereof comprises an interface configured to derive power from the activation and/or powering signals received by the input/output interface 220 of the memory device 200.

The second memory unit 120 and first memory unit 210 are configured to store information, or data, and further configured to receive information from other parts of the devices and to send information to the other parts of the device, i.e. to read and write information. The first and second memory units 210, 120 are configured to be in connection with and controlled by the processor 230 and the processor 110. In a further example embodiment, either the communications device 100 or the memory device 200 is configured to function in a passive mode. In a passive mode, the processor 110, 230 of either the communications device 100 or the memory device 200 is not active and the first or second memory unit 210, 120 is configured to be controlled by the processor 110, 230 of the active device. In an example embodiment, the first memory unit 210 comprises a protected section 240. The first and second memory units 120, 210 comprise any memory selected from a non-volatile and/or a volatile memory unit, such as a read-only memory unit (ROM), a programmable read-only memory unit (PROM), erasable programmable read-only memory unit (EPROM), a random-access memory unit (RAM), a flash memory unit, a data disk, an optical storage, a magnetic storage and/or a smart card.

In an example embodiment, the communications device 100 and the memory device 200 comprise a plurality of memory units. Each memory unit is either configured solely to store information or configured to serve other purposes in communication with further parts, such as to process information.

In addition to the elements shown in FIG. 2, in some example embodiments the communications device 100 and/or the memory device 200 comprise other elements, such as microphones or displays, as well as additional circuitry, memory chips, application-specific integrated circuits (ASIC), processing circuitry for specific purposes such as source coding and decoding circuitry, channel coding and decoding circuitry, ciphering and deciphering circuitry, and the like.

The memory device 200 is configured to derive the random challenge, for example a random signal or random bits of information, from at least one physical property of a radio signal. The memory device 200 is configured to apply the parts thereof, for example the processor 230 and the memory unit 210, in deriving the random challenge. In an example embodiment, in order to derive the random challenge, i.e. to form random information, the memory device 200 is configured to interpret noise in the radio signal as information bits and/or to receive bits with the quench turned off and/or to interpret the signal bits with the quench turned off and/or to use the duration of the signal to calculate random bits.

Figure 3:
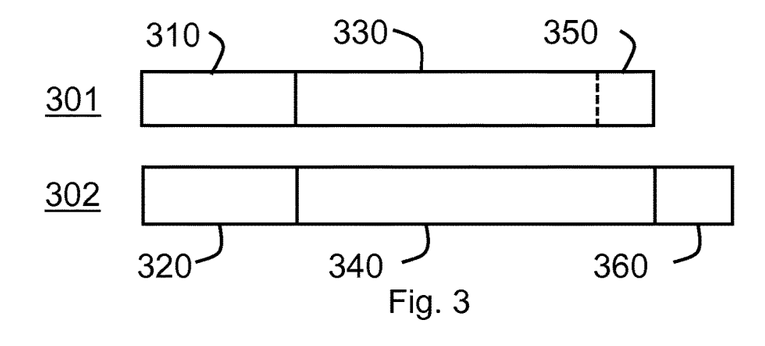
FIG. 3 shows protocol frames in accordance with some example embodiments.

FIG. 3 illustrates protocol frames used for transmitting data between apparatuses in some example methods. The protocol frames 301 and 302 comprise a header section 310 or 320, respectively. The header section 310,320 comprises information bits useful in implementing some methods. In an example embodiment, the information bits of the header 310,320 define whether or not a random challenge and/or a privacy enabler and/or an extension field 360 is/are included in the protocol frame. Protocol frame 301,302 comprises a payload section 330,340 containing a data field. In an example embodiment, the random challenge according to a method is contained in a section 350 of the data field of the payload section 330. In an example embodiment, the random challenge according to a method is contained in an extension field 360 of the data field of the payload section 340.

FIGS. 4 to 7 illustrate flowcharts, or messaging sequence charts, of processes of systems, methods and/or computer program products according to example embodiments.

Figure 4:
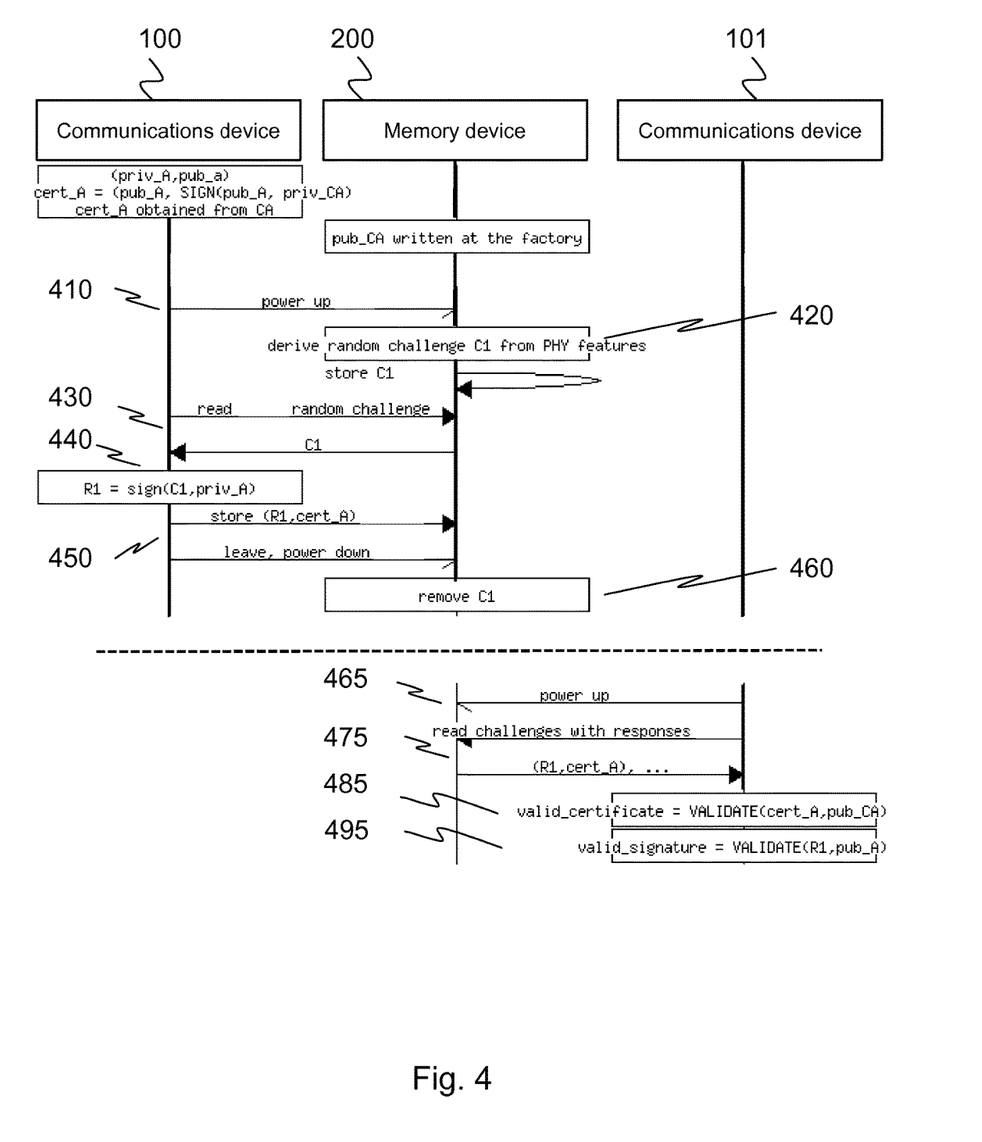
FIG. 4 shows a messaging sequence chart according to an example embodiment.

FIG. 4 illustrates a messaging sequence of a random challenge messaging method. At step 410 a communications device 100 transmits a radio signal containing an activation signal for the memory device 200 to power up, thus causing the memory device to activate. At step 420 the memory device 200 derives a random challenge C1, i.e. a random data stream, from at least one physical property of the activation signal sent by the communications device 100. The memory device 200 stores the random challenge C1 in the memory unit 210, see FIG. 2. The derivation of the random challenge C1 from the at least one physical property of the activation signal is carried out according to a method described hereinbefore. At step 430 the communications device 100 reads the random challenge C1 from the memory unit 210 of the memory device 200. At step 440 the communications device 100 computes a signature R1 from the random challenge C1 read form the memory device 200 and a private key priv_A of the communications device 100. The signature R1 together with a certificate cert_A of the communications device 100 is then transmitted to and stored into the memory unit 210 of the memory device 200 at step 450. After the signature R1 and the certificate cert_A have been stored into the memory unit 210 of the memory device 200, the communications device 100 transmits a radio signal to the memory device 200, the signal containing the intention of the communications device 100 to leave and instructions for the memory device 200 to deactivate or power down. At step 460 the random challenge C1 is removed from the memory unit 210 of the memory device 200.

Figure 5:
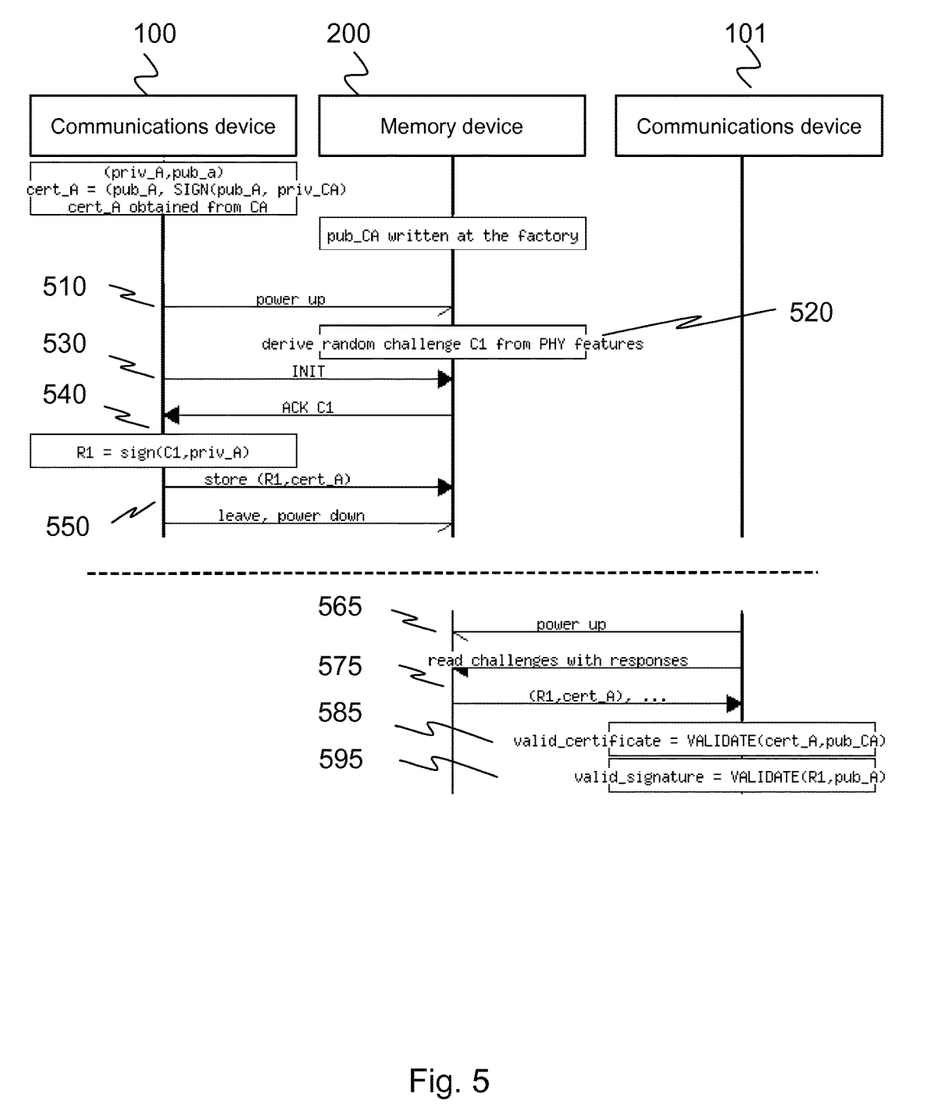
FIG. 5 shows a messaging sequence chart according to an example embodiment.

FIG. 5 illustrates a messaging sequence of a random challenge messaging method. At step 510 a communications device 100 transmits a radio signal containing an activation signal for the memory device 200 to power up. At step 520 the memory device 200 derives a random challenge C1, i.e. a random data stream, from at least one physical property of the activation signal sent by the communications device 100. The derivation of the random challenge C1 from the at least one physical property of the activation signal is carried out according to a method described hereinbefore. At step 530 the communications device 100 transmit a radio signal to the memory device 200, the signal containing an initiation command causing the memory device 200 to transmit the random challenge C1 to the communications device 100 as a part of a protocol frame 301 or 302 described hereinbefore, see FIG. 3. At step 540 the communications device 100 computes a signature R1 from the random challenge C1 sent by the memory device 200 and a private key priv_A of the communications device 100. The signature R1 together with a certificate cert_A of the communications device 100 is then transmitted to and stored into the memory unit 210 of the memory device 200 at step 550. After the signature R1 and the certificate cert_A have been stored into the memory unit 210 of the memory device 200, the communications device 100 transmits a radio signal to the memory device 200, the signal containing the intention of the communications device 100 to leave and instructions for the memory device 200 to deactivate or power down.

In an example embodiment of the random challenge messaging method, the communications device 100 is able to set a privacy level when communicating with the memory device 200 in order to control the amount of information that is stored into the memory device 210 of the memory device 200. The set privacy level is controlled at the beginning of the communication between the communications device 100 and the memory device 200. The user of the communications device may be requested to approve storing of information beyond the set privacy level.

FIGS. 4 and 5 further illustrate additional steps of a random challenge messaging method. At step 465, 565 a further communications device 101 transmits a radio signal containing an activation signal for the memory device 200 to power up. At step 475, 575 the communications device 101 reads the stored signature R1 and the certificate cert_A from the memory unit 210 of the memory device 200. The communications device 101 validates the certificate cert_A and the signature R1 using public keys pub_Ca, pub_A at steps 485, 585, 495, 595. In an embodiment of the messaging method the communications device 101 has no previous information on whether any random challenge C1, signature and/or certificates have been stored in the memory unit 210 of the memory device 200. Accordingly, after receiving the activation signal, the memory device 200 indicates to the communications device 101 whether a random challenge, signature and or certificate has been stored in the memory unit 210 of the memory device 200 and the location of said stored information. Furthermore, the memory device 200 may provide the communications device 101 information on whether the stored random challenge, signature and/or certificate is still valid, i.e. not too old.

Figure 6:
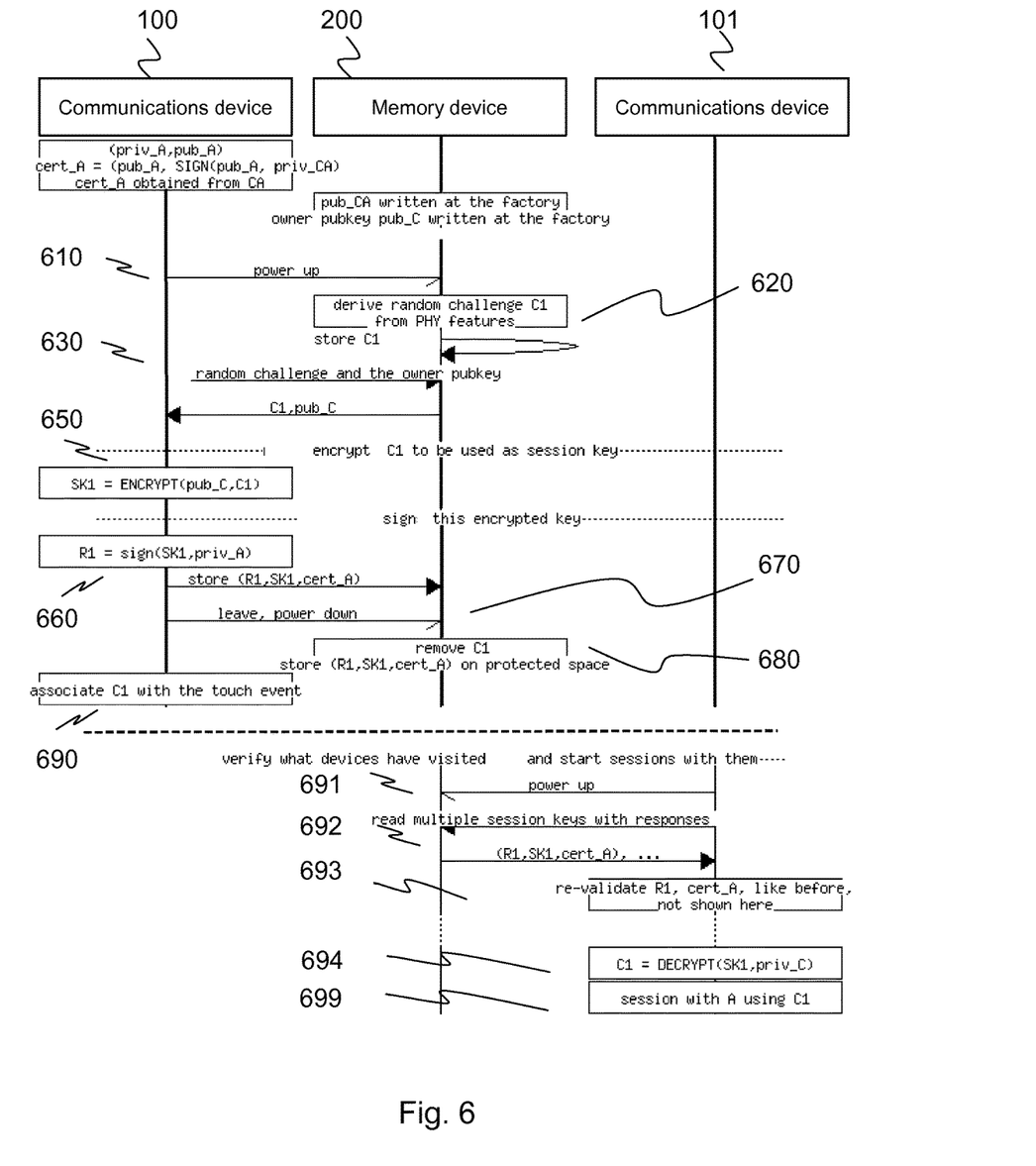
FIG. 6 shows a messaging sequence chart according to an example embodiment.

FIG. 6 illustrates a messaging sequence of a random challenge messaging method. At step 610 a communications device 100 transmits a radio signal containing an activation signal for the memory device 200 to power up. At step 620 the memory device 200 derives a random challenge C1, i.e. a random data stream, from at least one physical property of the activation signal sent by the communications device 100. The memory device 200 stores the random challenge C1 in the memory unit 210, see FIG. 2. The derivation of the random challenge C1 from the at least one physical property of the activation signal is carried out according to a method described hereinbefore. At step 630 the communications device 100 reads the random challenge C1 from the memory unit 210 of the memory device 200. At step 650 the communications device 100 encrypts the random challenge C1 read form the memory device 200 with a public key pub_C to form a session key SK1. At step 660 the communications device 100 computes a signature R1 from the encrypted session key SK1 and a private key priv_A of the communications device 100. The encrypted session key SK1 and the signature R1 together with a certificate cert_A of the communications device 100 are then transmitted to the memory device 200 at step 670. After the encrypted session key SK1, the signature R1 and the certificate cert_A have been transmitted, the communications device 100 transmits a radio signal to the memory device 200, the signal containing an intention of the communications device 100 to leave and instructions for the memory device 200 to deactivate or power down. At step 680 the random challenge C1 is removed from the memory unit 210 of the memory device 200 and the encrypted session key SK1, the signature R1 and the certificate cert_A are stored into a protected space 240 of the memory unit 210 of the memory device 200. At step 690 the communications device 100 associates the random challenge C1 with the communication or touch event with the memory device 200.

FIG. 6 further illustrates additional steps of a random challenge messaging method. At step 691 a further communications device 101 transmits a radio signal containing an activation signal for the memory device 200 to power up. At step 692 the communications device 101 reads the stored signature R1, the certificate cert_A, and the session key SK1 from the protected space 240 of the memory unit 210 of the memory device 200. The communications device 101 validates the certificate cert_A and the signature R1 using public keys pub_Ca, pub_A at step 693. At step 694 the communications device 101 decrypts the encrypted session key SK1 using a private key priv_C, thus gaining access to the random challenge C1. At step 699 communications device 101 starts a session with communications device 100 using the random challenge C1 which the communications device 100 has associated with the communication or touch event with memory device 200.

In an example embodiment, several signatures, certificates and session keys are read at step 692 and processed further, respectively, as described hereinbefore.

Figure 7:
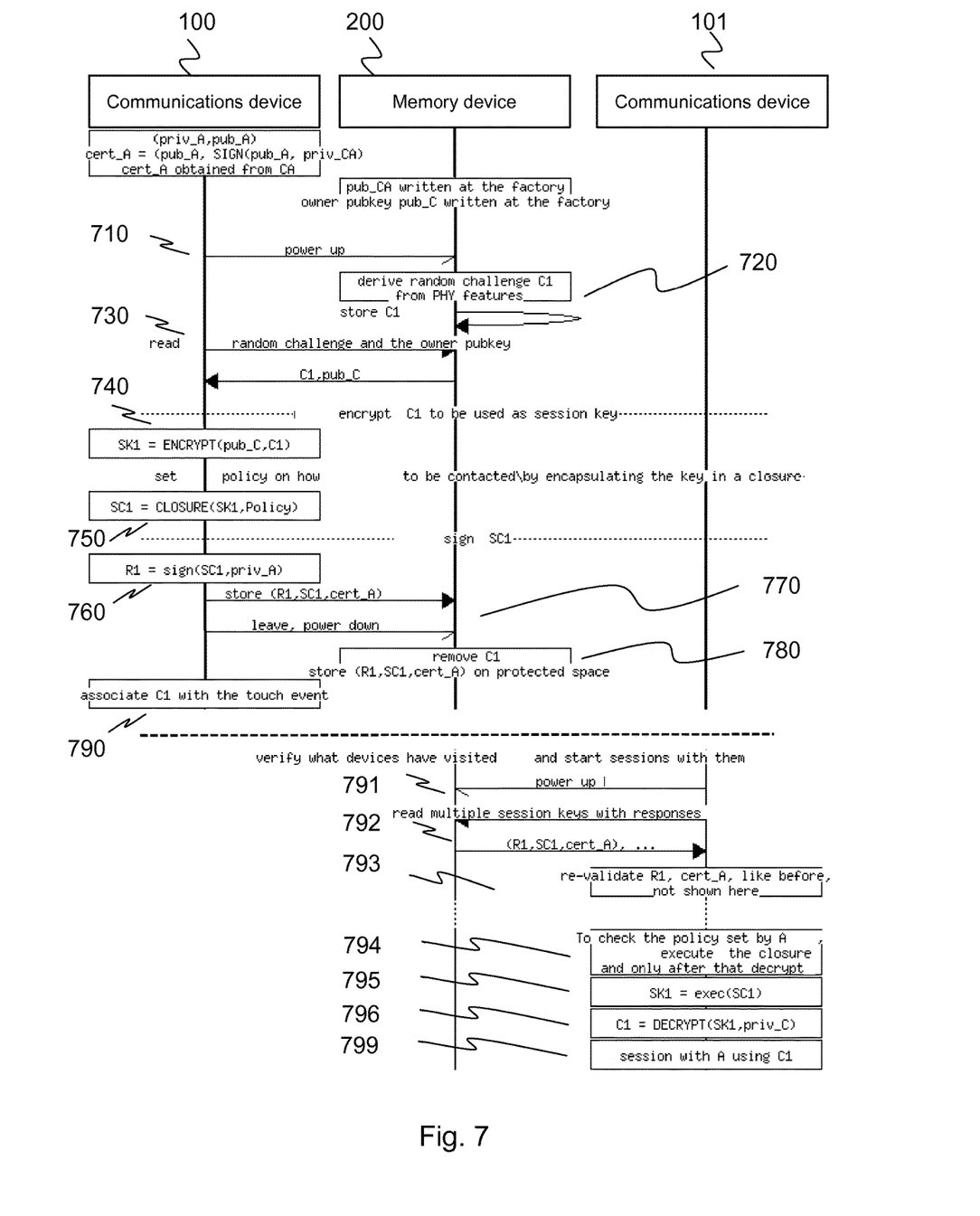
FIG. 7 shows a messaging sequence chart according to an example embodiment.

FIG. 7 illustrates a messaging sequence of a random challenge messaging method. At step 710 a communications device 100 transmits a radio signal containing an activation signal for the memory device 200 to power up. At step 720 the memory device 200 derives a random challenge C1, i.e. a random data stream, from at least one physical property of the activation signal sent by the communications device 100. The memory device 200 stores the random challenge C1 in the memory unit 210, see FIG. 2. The derivation of the random challenge C1 from the at least one physical property of the activation signal is carried out according to a method described hereinbefore. At step 730 the communications device 100 reads the random challenge C1 and a public key pub_C from the memory unit 210 of the memory device 200. At step 740 the communications device 100 encrypts the random challenge C1 read form the memory device 200 with the public key pub_C read form the memory device 200 to form a session key SK1. At step 750 the communications device 100 calculates a computational closure SC1 encapsulating the encrypted session key SK1 and a privacy policy of the communications device. At step 760 the communications device 100 computes a signature R1 from the computational closure SC1 and a private key priv_A of the communications device 100. The computational closure SC1 and the signature R1 together with a certificate cert_A of the communications device 100 are then transmitted the memory device 200 at step 770. After the computational closure SC1, the signature R1 and the certificate cert_A have been transmitted, the communications device 100 transmits to the memory device 200 a radio signal containing an intention of the communications device 100 to leave and instructions for the memory device 200 to deactivate or power down. At step 780 the random challenge C1 is removed from the memory unit 210 of the memory device 200 and the computational closure SC1, the signature R1 and the certificate cert_A are stored into a protected space 240 of the memory unit 210 of the memory device 200. At step 790 the communications device 100 associates the random challenge C1 with the communication or touch event with the memory device 200.

FIG. 7 further illustrates additional steps of a random challenge messaging method. At step 791 a further communications device 101 transmits a radio signal containing an activation signal for the memory device 200 to power up. At step 792 the communications device 101 reads the stored signature R1, the certificate cert_A, and the computational closure SC1 from the protected space 240 of the memory unit 210 of the memory device 200. The communications device 101 validates the certificate cert_A and the signature R1 using public keys pub_CA, pub_A at step 793. At step 794 the communications device 101 obtains the encrypted session key SK1 and checks the privacy policy of the communications device 100 by executing the computational closure SC1. At step 795 the communications device 101 decrypts the encrypted session key SK1 using a private key priv_C, thus gaining access to the random challenge C1. At step 799 communications device 101, depending on the privacy policy of the communications device 100, starts a session with communications device 100 using the random challenge C1 which the communications device 100 has associated with the communication or touch event with memory device 200.

In an example embodiment, several signatures, certificates and computational closures are read at step 792 and processed further, respectively, as described hereinbefore.

Some use cases relating to given example embodiments of the random challenge messaging are presented in the following. In a first use case, the random challenge messaging is generally used in connection with memory devices in situations or transactions which benefit from cryptographically authenticated communication. Such situations include but are not limited to wireless flashing, retail and image variants flashing, public or private tag visits, or as a part of communications with a memory device attached to an item or a product, such as a subscribed magazine, the use of which requires authentication. Furthermore, in an example use case, the random challenge messaging is used to retrieve cryptographic information from a protected memory section of the memory device. The cryptographic information, can be such as cryptographic keys pre-stored by the manufacturer of the memory device, In a second use case, the random challenge messaging is used in a public use memory device, for example a radio frequency memory tag, contacted by different users of communications devices, for example mobile phones, in order for them to receive information on a subject of interest. A more specific example of this use case is a radio frequency memory tag situated at a movie theatre in order to provide information on for example the scheduled showtimes. Some example embodiments of random challenge messaging are applied in order for the public use memory device, or rather the owner thereof, to retain the identities, i.e. the signatures or the like, of the communications device users, who have tapped or accessed the memory device. The owner of the public use tag would be able to use the retained identities to gather for example statistical usage data useful in e.g. marketing, or to communicate with the users of the communications devices at a later date, or send those users further information like advertisements, if the users have enabled a privacy level allowing this.

In a third use case, the random challenge messaging is applied by a user of a communications device in order to keep track of her communications history. The communications device of the user stores a history of all communications with various memory devices using random challenge messaging, i.e. the communications device saves the random challenges received from the memory devices together identifying information on the communications, such as time and place of the communication. Should the user of a communications device later receive a communication or a message or the like from an owner of a memory device with which a communication had previously occurred, the user of the communications device would be immediately aware which previous communication had caused the new contact. As the new communication would contain the random challenge retrieved from the memory device previously communicated with. Furthermore, in an example use case of the random challenge messaging, the communications device is provided with a user interface for controlling the communications history, setting or enforcing the privacy rules and for accepting or declining any further communications occurring due to previous communications. Furthermore, in an example use case of the random challenge messaging, the user of a communications device might later receive communications from another user, due to a similar communications history of the two users, i.e. due to the both users having communicated with the same memory device or devices previously.

In a fourth use case, the random challenge messaging is used to enable the memory device to provide services to the user of a communications device communicating with the memory device. The memory device for example provides a cryptographically authenticated connection to other services, for example a secure internet connection in a public environment, using the random challenge messaging.

Without in any way limiting the scope, interpretation, or application of the appended claims, a technical effect of one or more of the example embodiments disclosed herein is to provide a simple way of generating a truly random signature. Another technical effect of one or more of the example embodiments disclosed herein is to make it possible to use passive memory devices, e.g. passive RF memory tags in secure communications since little computational power is required on the memory device. Another technical effect of one or more of the example embodiments disclosed herein is to provide a way of associating future communications with a previous communication session.

It will be understood that each operation of the flowcharts, and/or combinations of operations in the flowcharts can be implemented by various means. Means for implementing the operations of the flowcharts, combinations of the operations in the flowchart, or other functionality of the example embodiments described herein may comprise software, hardware, application logic or a combination of software, hardware and application logic. The application logic, software or an instruction set is maintained on any one of various conventional computer-readable media. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the afore-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the foregoing describes example embodiments of the invention, these descriptions should not be viewed in a limiting sense. Rather, there are several variations and modifications which may be made without departing from the scope of the present invention as defined in the appended claims.

What is claimed is:

1. A communications device comprising:
a memory unit;
and
at least one processor configured to:
 send an activation signal to a memory device;
 read from the memory device a random challenge and a public key, the random challenge derived from at least one physical property of said signal;
 encrypt the random challenge read from the memory device with the public key read from the memory device to form an encrypted session key;
 calculate a computational closure encapsulating the encrypted session key and a privacy policy;
 compute a signature from the computational closure and a private key;
 cause transmission of at least the encrypted session key and the signature to the memory device; and
 start a communication session with a further communications device once the further communications device has read the signature and used the encrypted session key.

2. The device of claim 1, wherein the at least one processor is further configured to compute the signature using the random challenge and the private key.

3. The device of claim 1, wherein the at least one processor is further configured to:
compute the signature using the encrypted session key and the private key.

4. The device of claim 1, wherein the at least one processor is further configured to cause transmission of the computational closure to the memory device.

5. A memory device comprising:
a memory unit;
and
at least one processor configured to:
 receive an activation signal from a communications device;
 derive a random challenge from at least one physical property of the activation signal;
 receive at least an encrypted session key and a signature, wherein the encrypted session key was formed by encrypting the random challenge with a public key and the signature was computed from a computational closure and a private key, the computational closure calculated by encapsulating the encrypted session key and a privacy policy;
 store at least the encrypted session key and the signature; and
 cause a communications session between the communications device and a further communications device once the further communications device has read the signature and used the encrypted session key.

6. The memory device of claim 5, wherein the at least one processor is further configured to store said random challenge into a first preselected section of the memory unit.

7. The memory device of claim 5, wherein the at least one processor is further configured to send said random challenge as a part of a section of a protocol frame.

8. The memory device of claim 5, wherein the at least one processor is further configured to:
store said signature, said encrypted session key, and a certificate into a second preselected section of the memory unit.

9. The memory device of claim 6, wherein the at least one processor is further configured to remove said random challenge from the first preselected section of the memory unit.

10. The memory device of claim 5, wherein the at least one processor is further configured to derive the random challenge by interpreting noise of a radio signal as information bits.

11. The memory device of claim 5, further comprising a quench for receiving information over radio signals, wherein the at least one processor is further configured to derive the random challenge by receiving bits with the quench turned off.

12. The memory device of claim 11, wherein the at least one processor is further configured to derive the random challenge by interpreting a radio signal with the quench turned off.

13. The memory device of claim 12, wherein the at least one processor is further configured to derive the random challenge by using a duration of the radio signal to calculate random bits.

14. The memory device of claim 5, wherein the at least one processor is further configured to receive the computational closure from the communications device.

15. The memory device of claim 5, wherein the at least one processor is further configured to store a certificate or the computational closure in a protected section of the memory unit.

16. The memory device of claim 15, wherein the at least one processor is further configured to:
receive an activation signal from the further communications device; and to
send the signature and the certificate to the second communications device.

17. The memory device of claim 14, wherein the at least one processor is further configured to send the session key or the computational closure to the further communications device.

18. A method comprising:
sending an activation signal to a memory device;
reading from the memory device a random challenge and a public key, the random challenge derived from at least one physical property of said signal;
encrypting the random challenge read from the memory device with the public key read from the memory device to form an encrypted session key;

calculating a computational closure encapsulating the encrypted session key and a privacy policy;
computing a signature from the computational closure and a private key;
causing transmission of at least the encrypted session key and the signature to the memory device; and
starting a communication session with a further communications device once the further communications device has read the signature and used the encrypted session key.

19. The device of claim 1, wherein starting the communication session comprises starting the communication session in a manner dependent on the privacy policy after checking of the privacy policy by the further communications device.

* * * * *